United States Patent Office 3,236,654
Patented Feb. 22, 1966

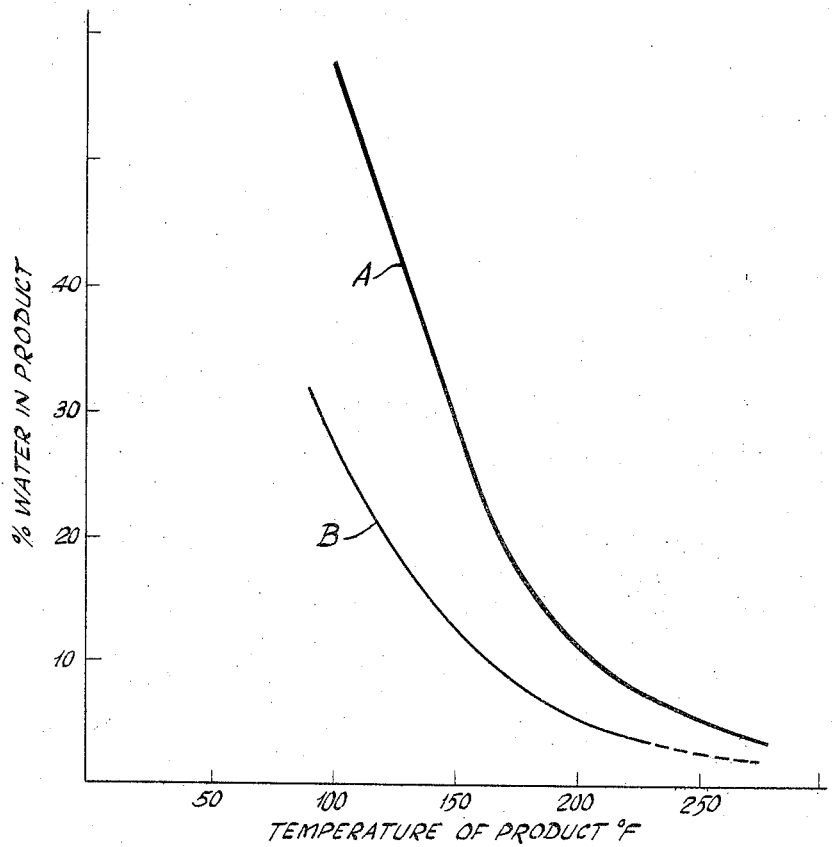

3,236,654
COMESTIBLE COATING COMPOSITION AND
METHOD OF PRODUCING SAME
David H. Lipka, Plain View, Long Island, N.Y., and Gilbert Finkel, South Amboy, N.J., assignors to DCA Food Industries Inc., New York, N.Y., a corporation of New York
Filed July 13, 1964, Ser. No. 382,089
17 Claims. (Cl. 99—93)

The present application is a continuation-in-part of copending U.S. patent application Serial No. 102,644, filed April 13, 1961, now abandoned.

The present invention relates generally to improvements in comestibles, and it relates in particular to an improved comestible particulate coating composition in the nature of a crumb, agglomerate or the like, and to a method of producing the same.

In the preparation of fried foods, such as fish, shrimp, poultry, meat, vegetable and the like, it is conventional to coat the foodstuff with a baked farinaceous particulate coating material such as cracker meal or bread crumbs. Heretofore, cracker meal has generally been commercially produced by combining flour of many types and origin with such additional materials as sugar, spices, non-fat dry milk, leavening, salt and other ingredients, together with water, to form an extrudable mass. The mass is then extruded under heavy pressure in a cohesive state and baked. The baked product is thereafter broken into small pieces and finally is ground to a fine state to form the cracker meal. The conventional cracker meal includes a starch component which is in a gelatinized state and a protein component which is in a denatured state and is characterized by the lack of residual moisture absorption when applied to a food substrate, inferior adhesion properties, and lack of distortion inhibiting properties. The conventionally produced cracker meal, particularly when applied to frozen foods, possesses many other drawbacks and disadvantages.

In the preparation of cracker meal-coated frozen foods, as for example, frozen fish sticks, the raw fish is initially in a frozen state and cut to the desired size and shape of the end product. The frozen fish sticks are coated with a suitable batter of an adhesive nature and the cracker meal then applied thereto, to cover completely the fish stick with the cracker meal which adheres thereto by reason of the batter, and forms a breading. The breaded product is then fried to cook and brown the breading and fix it to the fish or other food substrate. As a result of this frying step, the food substrate is heated considerably and, in many cases, partially cooked, a consequence which is highly undesirable. The above procedure necessitates the rapid refreezing of the food product generally with blast or plate freezing equipment, thereby appreciably increasing the cost of the end product. Moreover, the resulting foodstuff is of an inferior nature since in its final form, ready for consumption, portions thereof have been cooked more than once. The frozen food product, as received by the consumer, is normally reheated in the oven for about 10 to 15 minutes at a temperature of approximately 400° F. to 450° F. The food substrate at this point has lost some of its freshness and eating quality and the breading coating is no longer crisp and dry. It is thus obvious that the conventional frozen breaded food product leaves much to be desired.

It is, therefore, a principal object of the present invention to provide an improved comestible coating composition and an improved method of producing the same.

Another object of the present invention is to provide an improved cracker meal or bread crumb type of comestible coating composition and an improved method of producing the same.

Still another object of the present invention is to provide an improved cracker meal type of comestible coating composition which is of attractive appearance and which, upon heating thereof with an underlying food substrate, is crisp and dry with excellent eating qualities.

A further object of the present invention is to provide a coating composition of the above nature which is inexpensive and easy to apply and process, and to a simple method of producing the same.

Still a further object of the present invention is to provide an improved breaded frozen foodstuff which is simple and inexpensive to produce and results in a comestible which is easy to prepare for consumption and has superior eating qualities.

The above and other objects of the present invention will become apparent from a reading of the following description taken in conjunction with the accompanying drawing which is a graph illustrating the temperature range as related to the water content in drying the subject product.

The present invention, in a sense, contemplates the provision of a particulate comestible coating composition comprising a filamentary glutenous protein network matrix having distributed therein a substantially non-gelatinized starch in a finely divided state. The protein is advantageously gluten in a developed viable state and forms a three dimensional network which substantially delineates the support structure which effects the stable agglomeration of the non-gelatinized starch. The starch is advantageously a farinaceous material and may comprise wheat, corn, soya, oat, rice, rye, potato flour or other farinaceous materials or mixtures thereof. In addition, there may be admixed with the farinaceous materials suitable additives such as dry milk, salt, sugar spices, emulsifiers, flavoring, leavening, coloring agents and the like, which may constitute up to about 79% of the coating composition. The particles may advantageously be coated with a fatty material which may be in the form of a solid fat or an oil, such as lard, vegetable shortenings in normally solid or liquid states, hydrogenated oils, emulsifiers, etc. The moisture content of the improved particulate coating composition is advantageously between 0.2% and 12.0%, preferably between 0.2% and 6.5%, for example 5.5%, and the viable filamentary gluten forming the support network should constitute at least 2.2% by weight of the composition. The particle size of the comestible composition may advantageously be between U.S.S. 2 mesh and 200 mesh and preferably between U.S.S. 8 mesh and 100 mesh. The starch advantageously constitutes at least 20% and preferably between 80% and 88% by weight of the composition and advantageously is of a particle size of between 15 microns and 500 microns and is preferably in an agglomerated form such as obtained in normal wheat milling and is of a particle size between about 80 microns and 100 microns. No more than 10% of the starch should be gelatinized and preferably not more than 1%. The starch and gluten are advantageously in the form of a wheat flour, for example Canadian hard red winter wheat flour, and be of the proportions contained in such flour. Where flour is employed as the primary or sole source of the starch and gluten or as the sole source of the gluten, it is advantageously such as to provide at least the minimum gluten requirements of the product.

In producing the comestible composition by the present improved method, the starch and vital undenatured gluten and water are mixed and worked to form an agglomerated mass or agglomerated masses, the working and the energy being imparted to the mixture being sufficient to develop the gluten into a viable, three dimensional filamentary network. It is important that the mass neither be under-worked or overworked since such would either produce no filamentary network of viable gluten or destroy same. The working and development of the protein may be effected during the pelletizing of the mixture by tumbling in conventional pelletizing pans, by extrusion, by working in a screw conveyor, by extrusion through screens or other working procedure. While with normal wheat flour the working energy to develop the gluten is of the order of about 40 joules per gram of dough, the amount of working by any procedure in order to attain the desired filamentary state of the gluten can be readily determined by one skilled in the art. The vital gluten should constitute at least 2.2% of the dry ingredients and is advantageously present with the starch as a component of wheat flour, and in the working of the mixture an amount of gluten of at least 2.2% of the dry ingredients is developed into a viable filamentary network state.

While the amount of water in the worked mass may be very low, for example 7.0%, it is advantageously between 23% and 43%, and preferably between 31% and 36.5% for example 34.5%. The mass either as such or in a coarse or comminuted final particulate state is dried in the absence of any substantial gelatinization of the starch or denaturing of the gluten by any well known process to the moisture content of the final product, as above set forth. The drying may be, for example, effected by exposing the worked mass to infra-red radiation or otherwise heating it so that the temperature does not exceed the gelatinization temperature of the starch under the prevalent moisture content of the mass, which temperature is well known, increasing from about 100° F. to about 275° F. with a decrease in water content from about 60% to about 3%. Curve A in the graph shown in the drawing represents the upper temperature limit to which the material should be heated during the drying thereof as related to the water content of the material, above such curve undesirable gelatinization of the starch is effected and below such curve no significant gelatinization of the starch is effected or denaturing of the gluten. Curve B shows the relationship of temperature and water content of the material during an example of the drying thereof. The drying may be effected either before or after the comminuting of the material to the desired particle size of the end product, the comminuting being accomplished in any well known fashion. As an example, the particulate mass may be heated to a temperature of about 150° F. for a period of about 3 to 30 minutes, reducing the water content thereof to about 1% to 12%. It should be noted that other forms of non-gelatinizing drying may be employed, for example, vacuum drying or the like. High frequency heating is preferably avoided since this leads to gelatinization of the starch.

The particulate product described and produced above possesses many desirable and unexpected properties. It is characterized by a high degree of crispness, a low absorption of water in a condensed state and a relatively high absorption of steam. However, even under the conditions of high steam absorption, the product still possesses a high degree of crispness, superior to those of conventional materials. A photomicrograph of a section of a coating particle in accordance with the present invention reveals a unique structure not observed in any other particulate comestible material. In the present product, the starch in a non-gelatinized state is distributed throughout the particle in a discrete finely divided state, and the starch particles are interconnected by elongated filaments of gluten, the gluten defining a filamentary network which interconnects and supports the starch particles. In the conventional comestible crumb, the starch is gelatinized and the protein is in the form of discrete random particles.

After the particles have been produced as aforesaid, they may then be coated with a fatty material, advantageously between 2% and 15% by weight of the particles. The fatty material may be applied by spraying or the like and is readily absorbed so that there is no surface grease present. The resulting material unexpectedly possesses the appearance of a breading material, and when browned during or otherwise colored, the appearance is that of a fried breading material. A further unexpected property of the composition produced above, in addition to its resemblance to cracker meal, bread crumbs, and other material of a similar nature is that—unlike the latter— the present composition is non-gelatinized and non-denatured in protein structure. As a consequence, the coating material of the present invention has superior taste and eating qualities and possesses adhesive properties to the food substrate which have been heretofore unattainable.

The improved coating composition may be applied to a food substrate whether in the frozen, unfrozen or raw state, by employing any well known adhesive batter in the usual manner. The resulting product has the appearance of a fried breaded foodstuff and possesses the advantages of this type of food and relatively few of the disadvantages thereof particularly when the product is a frozen food In preparing the frozen food product, the food processor merely coats the frozen food in its final frozen state and shape, with the subject coating composition as aforesaid, and then packages the product without the necessity of further flash freezing. This is in sharp contrast to conventional procedures, wherein the processor coats the frozen foodstuff with a batter and meal, bread crumbs or other breading compounds, fries the product and then rapidly refreezes it, a practice which is expensive and requires a considerable additional power consumption and equipment. The consumer, in preparing the conventional breaded frozen product for consumption, reheats the same by baking or the like, which results in a recooking of part of the foodstuff resulting in an appreciable depreciation in the eating qualities of the food substrate as well as the crumb coating. On the other hand, when the consumer prepares the presently coated foodstuff by heating it, the food substrate is cooked for the first time and is at this optimum condition and the crumb coating is at its peak eating condition.

The following examples are given merely by way of illustration and are not intended to limit the scope of the present invention.

EXAMPLE I

A substantially uniform damp mass of the following ingredients are produced by spraying the water at 40° F. into the dry ingredients while effecting the thorough mixing thereof in a hooded planetary mixer fitted with a paddle:

| | Grams |
|---|---|
| Wheat flour | 1000.00 |
| Glucose | 20.00 |
| Sodium acid pyro phosphate | 1.50 |
| Bicarbonate of soda | 1.25 |
| Spice | 0.50 |
| Water | 320.00 |

The mixing was for a period of about 4 minutes at a rate of about 80 strokes per minute. The resultant mass was then forced through a U.S.S. No. 8 stainless steel wire cloth and the resulting particles dried by placing them on an oscillating table and exposing them for 18 to 20 minutes to three 250 watt infra-red heating lamps suspended five inches above the center of the bed of materials. The dried particles may then be sieved to the desired particle size range.

EXAMPLE II

The procedure of Example I is followed, the ingredients employed being 1000 grams of flour and 375 grams of water.

EXAMPLE III

A mixture of 1000 grams of wheat flour and 50 grams of non-fat dry milk solids and 20 grams of spices were placed in a revolving tilted pelletizing pan and 250 grams of water were sprayed upon the cascading material to form damp spheroids. No particular order need be followed in placing the material in the pan. The pan was of 14 inches diameter and was rotated at 42 revolutions per minute for a period of 2 minutes. The spheroids were then passed through a hammer mill fitted with a wire cloth of between about 1/4" and up to 1/2" and the output sieved, the desired size particles being dried in the manner set forth in Example I, the undersized particles being returned to the pelletizer and the oversized particles being recycled through the hammer mill.

EXAMPLE IV

The procedure of Example III is followed except that the ingredients employed are 1000 grams of wheat flour and 400 grams of water.

EXAMPLE V

A damp mass of 2000 grams of wheat flour and 280 grams of water was forced under a pressure of 10,000 pounds per square inch through a die having 3/16 inch by 1 1/4 inch holes and the resulting pellets were dried on an oscillating table by exposure for 4 minutes to infrared lamps. The dried product was then passed through a hammer mill and sized as earlier described. If desired, the sized dried particles may be advantageously further treated by spraying 160 grams of a vegetable oil thereon.

The procedures described above and the compositions of the end products may be modified in the manner earlier set forth. For example, a fatty material may be applied to the sized dried particles within the ranges previously indicated. The coating materials described above are applied to a food substrate in the usual manner. Where the food substrate is frozen, it is not heated and requires no freezing following the application of the coating but is merely packaged and cold storaged in the conventional fashion. It should be noted that in the above examples, in addition to the structural support network of vital gluten a dispersed material of starch in a substantially non-gelatinized state is included. The starch, being non-coherent, does not substantially contribute to the unity of the particle. Consequently other finely divided non-toxic, edible materials, which may be non-coherent, may be substituted in whole or in part for the starch. Examples of such materials are microcrystalline cellulose, ground bran, sugar, whole or refined cereals, fruit pulps, non-vital proteins, nuts, nut meats, chopped cocoanut meats, dried fruit, etc.

What is claimed is:

1. In a comestible coating composition, particles consisting essentially of three dimensional filamentary glutenous protein networks as support matrices and having distributed therein finely divided substantially non-gelatinized starch.

2. The comestible coating composition of claim 1 wherein said particles have a water content not exceeding 12% of the weight thereof.

3. The comestible coating composition of claim 1 wherein said glutenous protein network constitutes at least 2.2% by weight of said particles.

4. In a comestible coating composition, particles consisting essentially of three dimensional glutenous protein networks as support matrices, and having distributed therein and supporting a finely divided edible material and having a moisture content less than 12% based on the weight of said particles.

5. The comestible coating composition of claim 4 wherein said protein networks constitute at least 2.2% by weight of said particles.

6. The composition of claim 4, in which the particle size is between 2 and 200 mesh.

7. The composition of claim 4, wherein said finely divided edible material has a particle size between 15 and 500 microns.

8. The composition of claim 4, wherein said moisture content is between 0.2% and 6.5%.

9. The composition of claim 4, wherein a major part thereof is ungelatinized starch.

10. The composition of claim 1, wherein said particulate composition has between 2% and 15% by weight of a fatty material absorbed thereby.

11. The method of producing a particulate comestible coating composition comprising admixing substantially non-gelatinized starch, vital gluten in an amount constituting at least 2.2% by weight of the dry ingredients, and between 23% and 43% by weight of the mixture of water, working said mixture for a period of time sufficient to form an agglomerate of said mixture and to develop at least 2.2% of said gluten to a filamentary viable state and forming particles thereof, and reducing the water content thereof to no more than about 12% under substantially starch non-gelatinizing conditions.

12. The method of claim 11, wherein at least 20% by weight of said dry ingredients is non-gelatinized starch.

13. The method of claim 11, wherein said starch and gluten are in the form of wheat flour.

14. The method of claim 11, wherein no more than 20% of said starch is gelatinized during said water reduction step.

15. The method of claim 11, wherein the particulating of said mixture includes the step of comminuting said agglomerated mixture to a particulate state prior to said water reduction step.

16. The method of claim 11, wherein the particulating of said mixture includes the step of comminuting said composition subsequent to said water reduction step.

17. The method of claim 11, including the step of applying between 2% and 15% by weight of a fatty material to said particles following said water reduction step.

References Cited by the Examiner

UNITED STATES PATENTS

| | | | |
|---|---|---|---|
| 2,360,828 | 10/1944 | Craig | 99—166 |
| 3,023,104 | 2/1962 | Battista | 99—94 |
| 3,052,545 | 9/1962 | Ducharme et al. | 99—94 |
| 3,078,172 | 2/1963 | Libby | 99—195 |

A. LOUIS MONACELL, *Primary Examiner.*

RAYMOND N. JONES, *Examiner.*